(12) United States Patent
Lee et al.

(10) Patent No.: US 11,599,302 B2
(45) Date of Patent: Mar. 7, 2023

(54) STORAGE DEVICE AND METHOD OF OPERATING STORAGE DEVICE

(71) Applicant: SAMSUNG ELECTRONICS CO., LTD., Suwon-si (KR)

(72) Inventors: Jeong Woo Lee, Suwon-si (KR); Chan Ha Kim, Hwaseong-si (KR); Kang Ho Roh, Seoul (KR); Kwang Woo Lee, Seoul (KR); Hee Won Lee, Seoul (KR)

(73) Assignee: SAMSUNG ELECTRONIC CO., LTD., Suwon-si (KR)

( * ) Notice: Subject to any disclaimer, the term of this patent is extended or adjusted under 35 U.S.C. 154(b) by 114 days.

(21) Appl. No.: 16/829,660

(22) Filed: Mar. 25, 2020

(65) Prior Publication Data
US 2021/0072920 A1   Mar. 11, 2021

(30) Foreign Application Priority Data

Sep. 11, 2019 (KR) .................... 10-2019-0112920

(51) Int. Cl.
| | |
|---|---|
| *G06F 12/00* | (2006.01) |
| *G06F 3/06* | (2006.01) |
| *G06F 11/07* | (2006.01) |
| *G06F 11/30* | (2006.01) |
| *G06F 9/455* | (2018.01) |
| *G06K 9/62* | (2022.01) |
| *G06N 20/00* | (2019.01) |

(52) U.S. Cl.
CPC ............ *G06F 3/0658* (2013.01); *G06F 3/067* (2013.01); *G06F 3/0619* (2013.01); *G06F 3/0653* (2013.01); *G06F 3/0659* (2013.01); *G06F 3/0679* (2013.01); *G06F 9/45558* (2013.01); *G06F 11/0772* (2013.01); *G06F 11/3037* (2013.01); *G06K 9/6257* (2013.01); *G06N 20/00* (2019.01); *G06F 2009/45591* (2013.01)

(58) Field of Classification Search
USPC ........................................................ 711/154
See application file for complete search history.

(56) References Cited

U.S. PATENT DOCUMENTS

| | | | | |
|---|---|---|---|---|
| 6,173,306 | B1* | 1/2001 | Raz ....................... | G06F 9/5083 |
| | | | | 718/105 |
| 9,047,017 | B1* | 6/2015 | Dolan ................... | G06F 3/0685 |
| 9,256,371 | B2 | 2/2016 | Franceschini et al. | |
| 9,971,548 | B1* | 5/2018 | Talwar .................. | G06F 3/0613 |
| 10,127,234 | B1* | 11/2018 | Krishnan .............. | G06F 16/119 |
| 10,216,422 | B2 | 2/2019 | Kim et al. | |
| 2008/0022277 | A1* | 1/2008 | Kano .................... | G06F 3/0647 |
| | | | | 718/1 |
| 2013/0211809 | A1* | 8/2013 | Maruyama .......... | G06F 11/3447 |
| | | | | 703/21 |
| 2015/0324126 | A1* | 11/2015 | Nakajima ............... | G06F 3/067 |
| | | | | 711/114 |

(Continued)

*Primary Examiner* — Mohamed M Gebril
(74) *Attorney, Agent, or Firm* — Sughrue Mion, PLLC (57) ABSTRACT

A storage device, including a feature information database configured to store feature information about a memory device; and a machine learning module configured to select a machine learning model from a plurality of machine learning models the corresponding to an operation of the memory device based on the feature information, wherein the memory device is configured to operate according to the selected machine learning model.

20 Claims, 6 Drawing Sheets

(56) References Cited

U.S. PATENT DOCUMENTS

| | | | |
|---|---|---|---|
| 2015/0347183 A1* | 12/2015 | Borthakur | G06F 9/5088 |
| | | | 718/105 |
| 2018/0174658 A1 | 6/2018 | Kikuchi | |
| 2019/0087119 A1 | 3/2019 | Oh et al. | |
| 2019/0095299 A1 | 3/2019 | Liu et al. | |
| 2019/0108888 A1 | 4/2019 | Sarkar et al. | |
| 2019/0114078 A1* | 4/2019 | Oh | G06F 3/0604 |
| 2019/0132203 A1* | 5/2019 | Wince | G06F 9/445 |
| 2019/0147328 A1 | 5/2019 | Burr et al. | |
| 2019/0325308 A1* | 10/2019 | Chung | G06N 3/08 |
| 2020/0013124 A1* | 1/2020 | Obee | G06Q 40/08 |
| 2020/0133758 A1* | 4/2020 | Liu | G06F 3/0689 |
| 2020/0258235 A1* | 8/2020 | Lu | G06N 3/084 |
| 2020/0293940 A1* | 9/2020 | Chopra | G06F 16/26 |
| 2020/0372122 A1* | 11/2020 | Zargahi | G06N 3/088 |
| 2021/0072952 A1* | 3/2021 | Agarwal | H04W 4/12 |
| 2021/0075748 A1* | 3/2021 | Agarwal | G06F 3/04883 |
| 2021/0200448 A1* | 7/2021 | Chen | G06F 3/061 |
| 2021/0271757 A1* | 9/2021 | Horspool | G06F 21/554 |
| 2021/0345138 A1* | 11/2021 | Vandikas | H04W 24/08 |

\* cited by examiner

STORAGE DEVICE AND METHOD OF OPERATING STORAGE DEVICE

CROSS-REFERENCE TO THE RELATED APPLICATION

This application is based on and claims priority under 35 U.S.C. § 119 to Korean Patent Application No. 10-2019-0112920, filed on Sep. 11, 2019, in the Korean Intellectual Property Office, the disclosure of which is incorporated herein by reference in its entirety.

BACKGROUND

1. Field

The present disclosure relates to a semiconductor memory, and more particularly, to a storage device and a method of operating the same.

2. Description of Related Art

A storage device may include a nonvolatile memory. The storage device may retain stored data even when the power is off. Therefore, the storage device may be useful for long-term data storage. Storage devices may be used as main repositories in various electronic devices such as computers, smartphones, and smart pads.

As mobile devices become smaller, smaller storage devices are developed. Accordingly, the resultant process miniaturization increases the number of chips in a wafer, the number of blocks in a chip, and the number of wordlines in a block. The increased degree of integration of components within a wafer, chip or block also increases feature variations occurring between adjacent chips, between adjacent blocks, and between adjacent wordlines.

SUMMARY

According to embodiments, a storage device includes a feature information database configured to store feature information about a memory device; and a machine learning module configured to select a machine learning model from a plurality of machine learning models the corresponding to an operation of the memory device based on the feature information, wherein the memory device is configured to operate according to the selected machine learning model.

According to embodiments, a method of operating a storage device includes determining whether one or more machine learning models for an operation of a memory device includes a plurality of machine learning models; based on determining that the one or more machine learning models includes the plurality of machine learning models, determining indirect information about the memory device; selecting a machine learning model from the one or more machine learning models based on at least one from among direct information about the memory device or the indirect information about the memory device; and executing inference according to the machine learning model.

According to embodiments, a storage device includes a memory device; and a storage controller configured to: select a machine learning model from a plurality of machine learning models based on feature information about the memory device, execute inference according to the selected machine learning model, and tune the selected machine learning model according to an error between an actual measured value in the memory device and a predicted value of the selected machine learning model based on the feature information.

BRIEF DESCRIPTION OF THE DRAWINGS

These and other aspects will become apparent and more readily appreciated from the following detailed description, taken in conjunction with the accompanying drawings, in which.

DETAILED DESCRIPTION

Embodiments provide a storage device capable of reflecting various feature variations of the storage device, a computing system including the storage device, and a method of operating the storage device.

Figure 1:
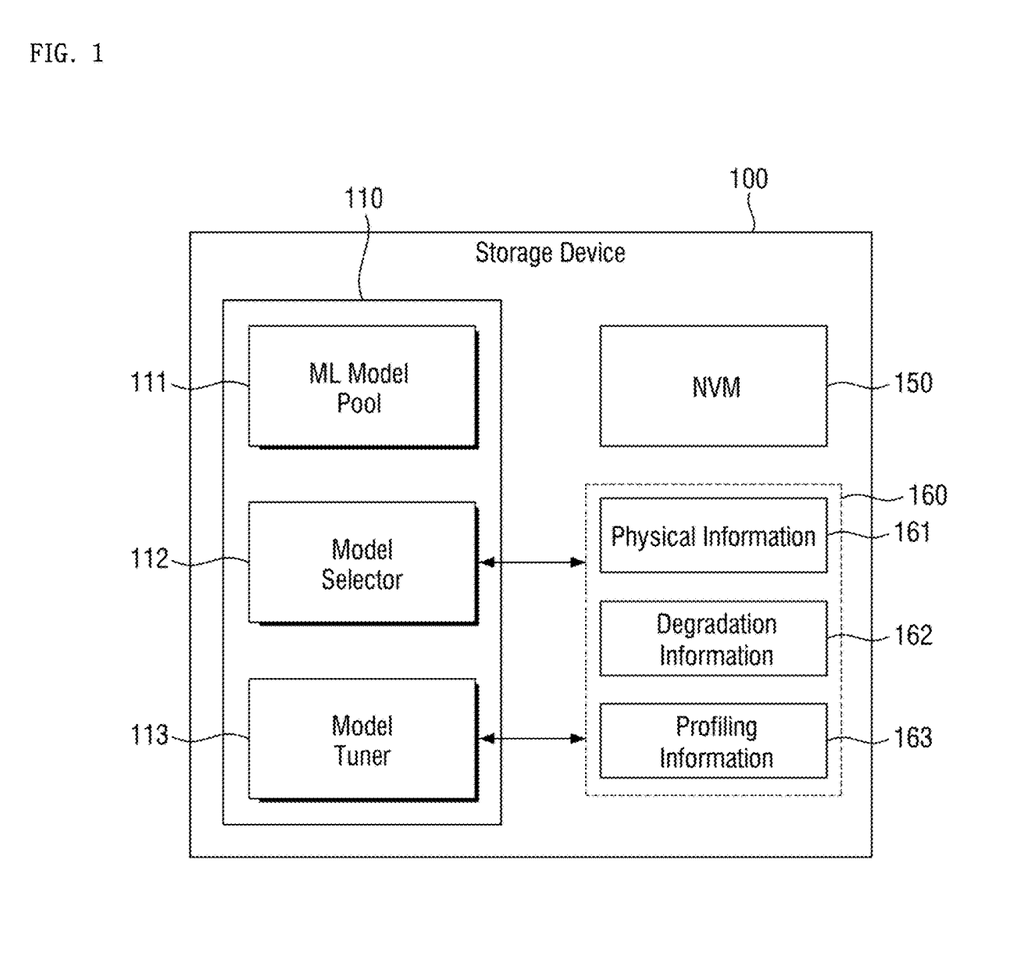
FIG. 1 is a block diagram of a storage device 100 according to embodiments.

FIG. 1 is a block diagram of a storage device 100 according to embodiments.

Referring to FIG. 1, the storage device 100 according to the embodiments may be implemented as, but is not limited to, a smart card, a secure digital (SD) card, a multimedia card (MMC), an embedded MMC (eMMC), an embedded multi-chip package (eMCP), a perfect page NAND (PPN), a universal flash storage (UFS), a universal serial bus (USB) flash drive, a solid state drive (SSD), or an embedded SSD (eSSD).

The storage device 100 may include a machine learning (ML) module 110, a memory device 150, and a feature information database 160. The term 'module', as used herein, means, but is not limited to, a software or hardware component, such as a Field Programmable Gate Array (FPGA), or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The memory device 150 may be, for example, a device based on a nonvolatile memory (NVM), for example a NAND flash memory. The memory device 150 may include a memory cell array, the memory cell array may include a plurality of blocks, each of the blocks may include a plurality of pages, and each of the pages may include nonvolatile memory cells.

The machine learning module 110 may machine-learn feature information about the memory device 150 according to the operation of the memory device 150 in order to enable the memory device 150 to operate more efficiently. The machine learning module 110 may select an optimal machine learning model for the operation of the memory device 150 based on feature information stored in the feature information database 160. The memory device 150 may operate according to the selected optimal machine learning model.

According to embodiments, when the operation of the memory device 150 is controlled according to the optimal machine learning model, if measured feature information about the memory device 150 and the operation of the memory device 150 is different from a predicted value of the optimal machine learning module based on current feature information by more than a predetermined range, the machine learning module 110 may tune parameters of the selected optimal machine learning model.

According to embodiments, when the operation of the memory device 150 is controlled according to the optimal machine learning model, if measured feature information about the memory device 150 is different from a predicted value of the selected machine learning module by more than a predetermined range, another machine learning model which minimizes an error between the measured feature information and the predicted value may be selected instead of the selected machine learning model.

The feature information database 160 may include the feature information about the memory device 150. That is, the feature information database 160 may include feature information about each memory cell, each page, and each block.

The memory cells may have slightly different features even if they are manufactured through the same process. The feature information may include all data that can represent features of each memory cell.

According to embodiments, the feature information may include physical information 161, degradation information 162, and profiling information 163 as illustrated in FIG. 1.

The physical information 161 may be fixed information regarding physical features of each memory cell. For example, the physical information 161 may include a Lot ID, a chip number, a block address, and a wordline number. However, the physical information 161 according to the current embodiment is not limited to this example.

The degradation information 162 may be information indicating the degree to which each memory cell is degraded according to its operation. That is, the degradation information 162 is log information about the progress of degradation. The degradation information may include various value representing degrees of degradation, for example, a program erase (PE) cycle, a read count, a retention time, a program time, and a program/read temperature. However, the degradation information 162 according to the current embodiment is not limited to this example.

The profiling information 163 may be information indicating the strength of each memory cell against degradation. For example, the profiling information 163 may include strength against retention, strength against read, strength against temperature, and strength against PE cycle and may even include error information between measured values and predicted values for various feature information about each memory cell according to a machine learning model. However, the profiling information 163 according to the current embodiment is not limited to this example.

The machine learning module 110 may include a model pool 111, a model selector 112, and a model tuner 113.

The model pool 111 may store two or more machine learning models. Each of the machine learning models may be a model trained using training data related to the operation of the memory device 150 based on various feature information about each memory cell. According to various embodiments, the training data may be based on the feature information stored in the feature information database 160, may be based on feature information preset by a user at the time of design, or may be based on the feature information about the memory cells monitored and collected in real time during the operation of the memory device 150.

Figure 4:
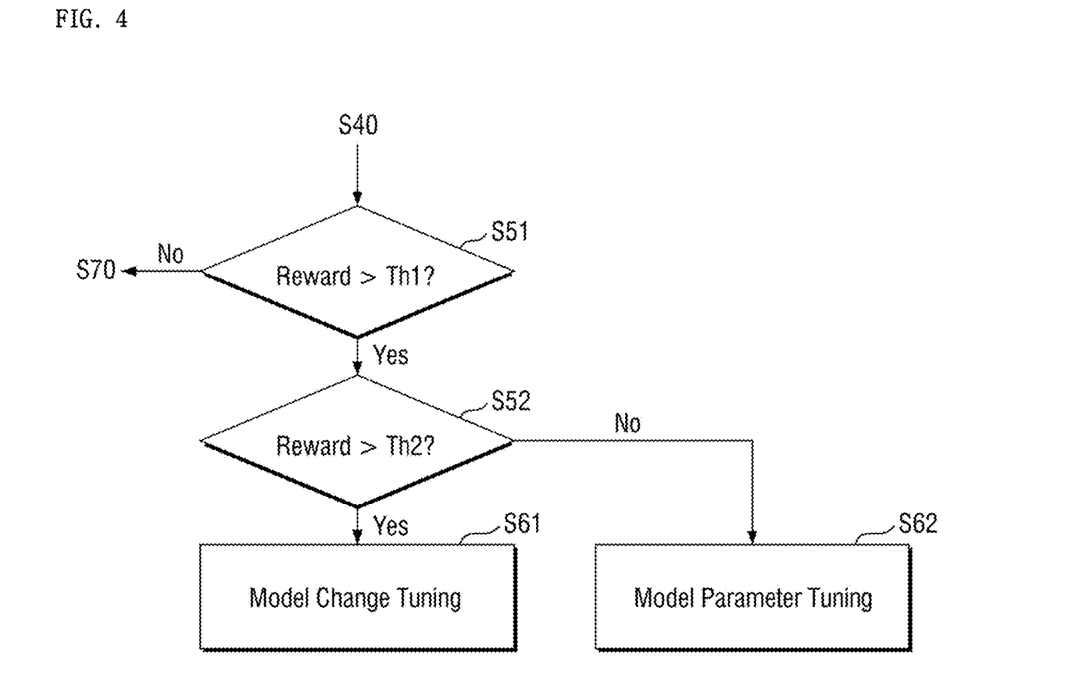

The model pool 111 may include machine learning models that are based on feature information about the memory device 150 itself or measured in the operation of the memory device 150. In addition, according to embodiments, the model pool 111 may further include a virtual machine learning model that is based on synthetic data of a predictable range by considering a variation trend of the feature information about the memory device 150. Examples of machine learning models stored in the model pool 111 will be described in more detail later with reference to FIG. 4.

The model selector 112 may receive current feature information about the memory device 150 from the feature information database 160 and select at least one machine learning model based on the received feature information. An example of selecting at least one optimal machine learning model from a plurality of machine learning models will be described later with reference to FIG. 3.

In some embodiments, the model selector 112 may be a mapping table in which the feature information about the memory device 150 is matched with machine learning models. The model selector 112 implemented in the form of a mapping table may save the time and cost required to select an optimal machine learning model.

In some embodiments, the model selector 112 may select a machine learning model from machine learning models, to which the feature information about the memory device 150 is applied, according to an error between a predicted value and a measured value. That is, an optimal machine learning model may be selected after a profiling operation for measuring an error between a measured value in the memory device 150 and a predicted value of each machine learning model is performed.

In some embodiments, two or more machine learning models may be selected based on the current feature information about the memory device 150. In this case, the model selector 112 may select two or more machine learning models as candidates according to the mapping table based on the current feature information about the memory device 150 and select an optimal machine learning model that minimizes an error between a measured value and a predicted value by applying the current candidate information to the candidates.

The machine learning module 110 may execute inference, that is, control the operation of the memory device 150 according to the optimal machine learning model.

The model tuner 113 may tune a machine learning model selected by the model selector 112 during runtime of the storage device 100.

In some embodiments, the model tuner 113 may tune the machine learning model according to a preset rule. For example, when a measured value and a predicted value of the machine learning model are different, in particular, when an error between the measured value and the predicted value is greater than a preset threshold range, parameters of the selected machine learning are tuned. That is, at least one parameter may be increased or decreased.

In some embodiments, the model tuner 113 may tune the selected machine learning model using a reinforcement learning technique. An example of the reinforcement learning technique will be described in detail later with reference to FIG. 5.

The model tuner 113 may update the current machine learning model stored in the model pool 111 to the tuned machine learning model.

FIGS. 2 through 5 are flowcharts illustrating a method of operating a storage device according to embodiments.

Figure 2:
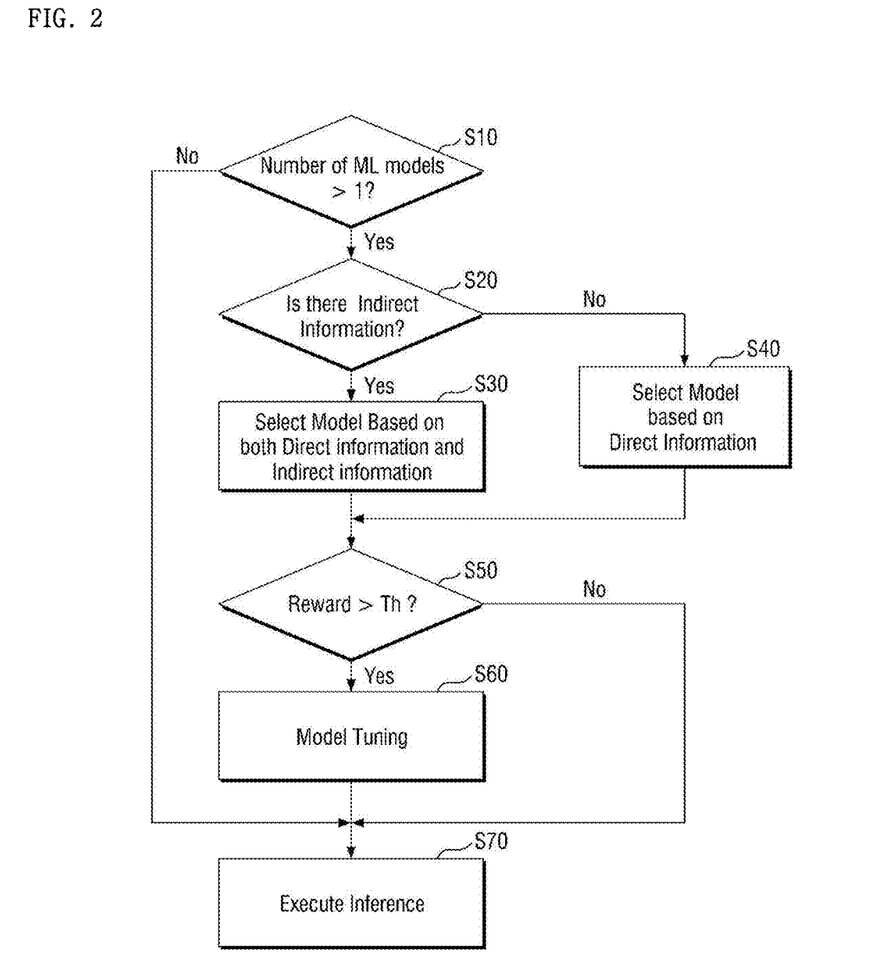
FIGS. 2 through 5 are flowcharts illustrating a method of operating a storage device according to embodiments.

First, referring to FIG. 2, at operation S210 the storage device 100 may determine whether there are a plurality of machine learning models. For example, referring to FIG. 1, the storage device 100 may check whether there are a plurality of machine learning models utilized to control the operation of the memory device 150.

If there are two or more machine learning models, operations may be performed to select a machine learning model most suitable for the operation of a memory device. Specifically, at operation S20 the storage device 100 may determine whether there is indirect information about the memory device. If there is no indirect information, at operation S40 an optimal machine learning model may be selected based on direct information only.

However, if there is indirect information, at operation S30 the optimal machine learning model may be selected based on both the indirect information and the direct information. The direct information may include information about the memory device that can be obtained without any operation, for example, the physical information 161 and the degradation information 162 of FIG. 1. The indirect information may include information obtained after the direct information is preprocessed according to the operation of the memory device, for example, the profiling information 163 of FIG. 1.

At operation S30, the optimal machine learning model may be selected by comprehensively considering a feature database of the memory device and a machine learning model pool. For example, the optimal machine learning model may be selected from the machine learning module 110 in the storage device 100 of FIG. 1.

Figure 3:
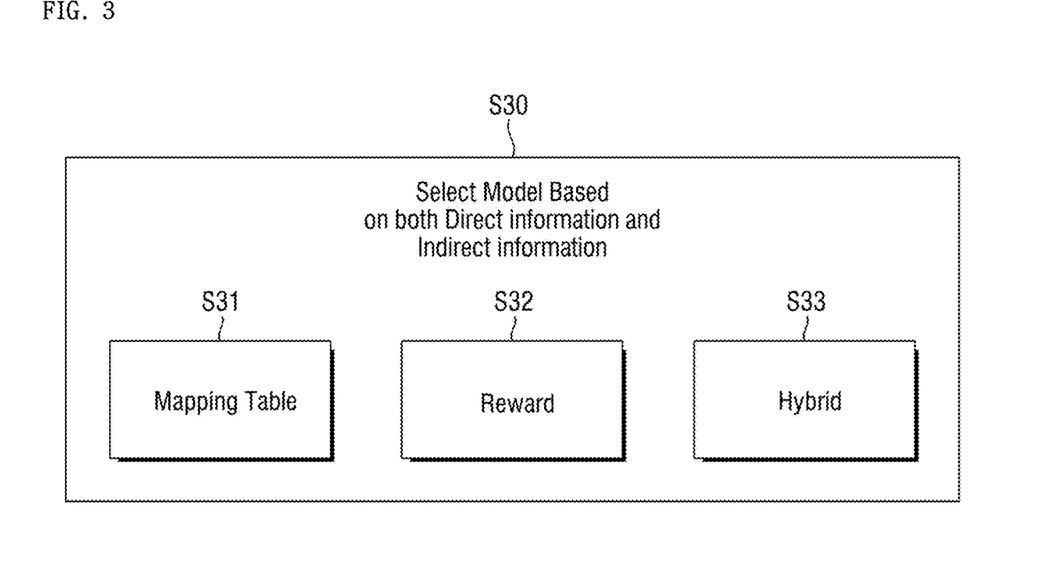

In some embodiments, the optimal machine learning may be selected model according to the direct information and the indirect information based on a mapping table at operation S31. In some embodiments, the optimal machine learning model may be selected according, to a reward, that is, an error between a predicted value of each machine learning model and a measured value at operation S32. In some embodiments, the optimal machine learning model may be selected using a hybrid method. Specifically, two or more machine learning models may be selected as candidates based on the mapping table, and then the optimal machine learning model may be selected from the candidates according to the reward at operation S33.

In some embodiments, the storage device may execute inference using the machine learning model, that is, tune the machine learning model using a reinforcement learning technique in order for more accurate prediction of operation control. Here, the reinforcement learning technique identifies, as a reward, an error between a predicted value of the currently selected machine learning model and a measured value identified by actually applying a current state at operation S50. If the error is within a threshold Th (which may mean smaller than the threshold Th, the storage device 100 may execute inference using the selected machine learning model without tuning at operation S70. If the error is greater than the threshold Th, the storage device 100 may tune the selected machine learning model during runtime at operation S70).

Figure 5:
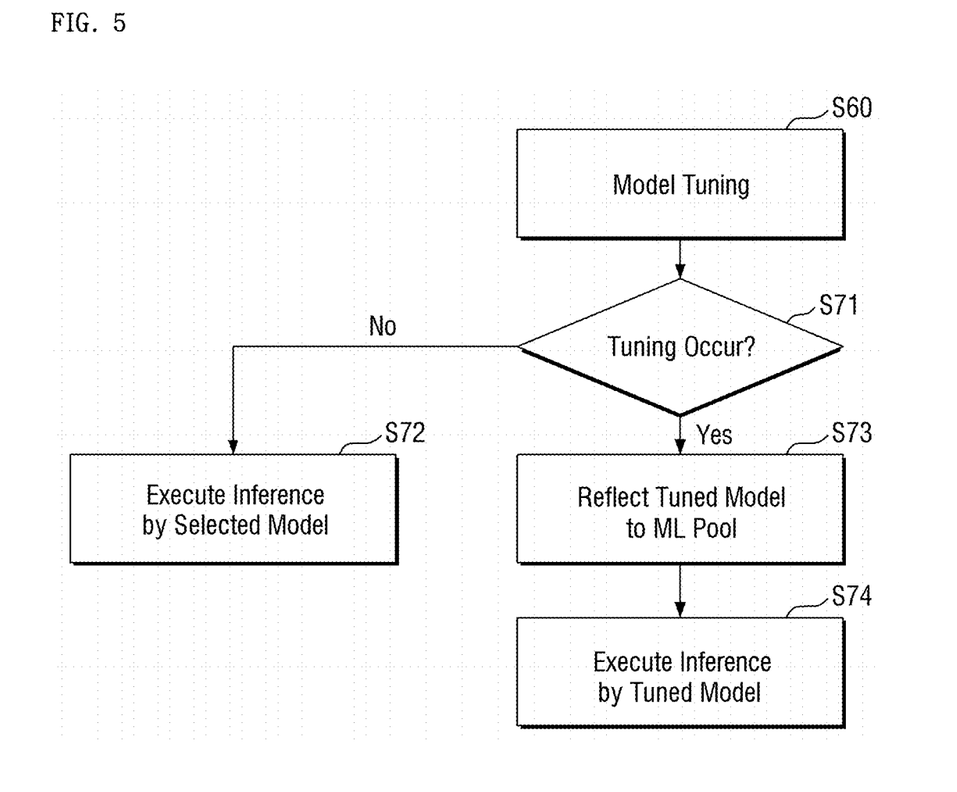

In operation S60 in which the selected machine learning model is tuned, the selected machine learning model may be tuned using the reinforcement learning technique. The tuned machine learning model can efficiently cope with circumstances unforeseen when the machine learning model was designed. According to embodiments, when the measured value and the predicted value of the machine learning model are different, in particular, if the error is greater than a first preset threshold range Th1, it may be determined that tuning is necessary. If the error is equal to or smaller than the first threshold range Th1, it may be determined that tuning is not necessary at operation S51.

If tuning is necessary, the storage device 100 may determine whether the error is greater than a second threshold range Th2 at operation S52. If the error is greater than the second threshold range Th2, the storage device may reselect a machine learning model at operation S61. If the error is equal to or smaller than the second threshold range Th2, the storage device may tune parameters of the selected machine learning model in operation S62. In embodiments, at least one parameter may be increased or decreased at operation S62.

The memory device may execute inference using the optimal machine learning model selected adaptively according to features of the memory device at operation S70. Specifically, at operation S70 the storage device 100 may determine whether model tuning has occurred. If there has been no tuning, at operation S72 inference may be executed using the machine learning model selected in operation S30. If model tuning has occurred, at operation S73 the toned machine learning model may be reflected in the model pool, and at operation S74 inference may be executed using the tuned machine learning model. Although operations S73 and S74 are illustrated in sequence, they may be performed simultaneously or in reverse order, for example S73 may be performed after S74, according to embodiments.

Figure 6:
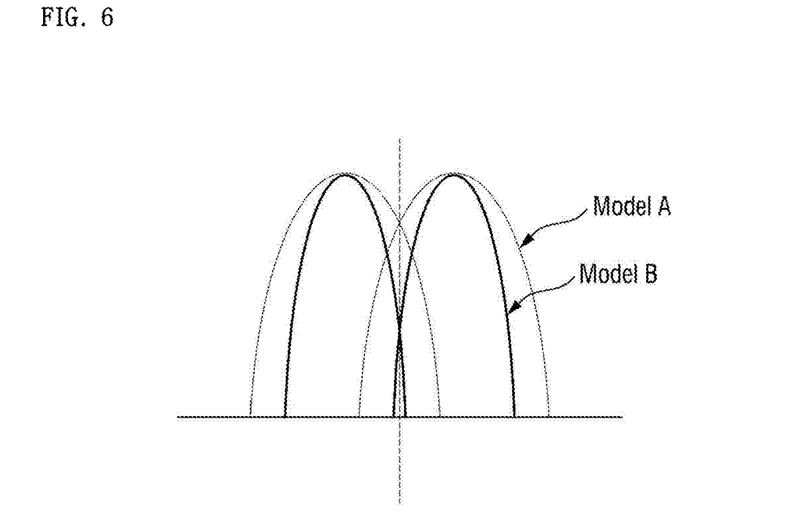
FIG. 6 is a diagram for explaining the relationship between features of a nonvolatile memory and machine learning models in a storage device according to embodiments.

FIG. 6 is a diagram for explaining the relationship between features of a nonvolatile memory and machine learning models in a storage device according to an embodiment.

The memory device 150 may have distributions of different memory areas depending, on their location even if they are equally degraded. In FIG. 6, a thin solid line (model A) may represent the dispersion of a memory region having a relatively high error bit due to a wide dispersion width. A thick solid line (model B) may represent the dispersion of a memory region exhibiting greater strength against degradation due to a narrow dispersion width.

Based on these features of the memory device 150, a model selector 112 may select a suitable model based on the degree of degradation in the memory, which may correspond to the strength information for degradation. The degree of degradation in the memory area may be obtained by applying the same degradation for each of the memory areas. The same degradation may be performed for the different memory areas based on the information collected by a special profiling action or by checking the degradation degree of the memory area at the same time, using an operation such as Patrol Read.

Figure 7:
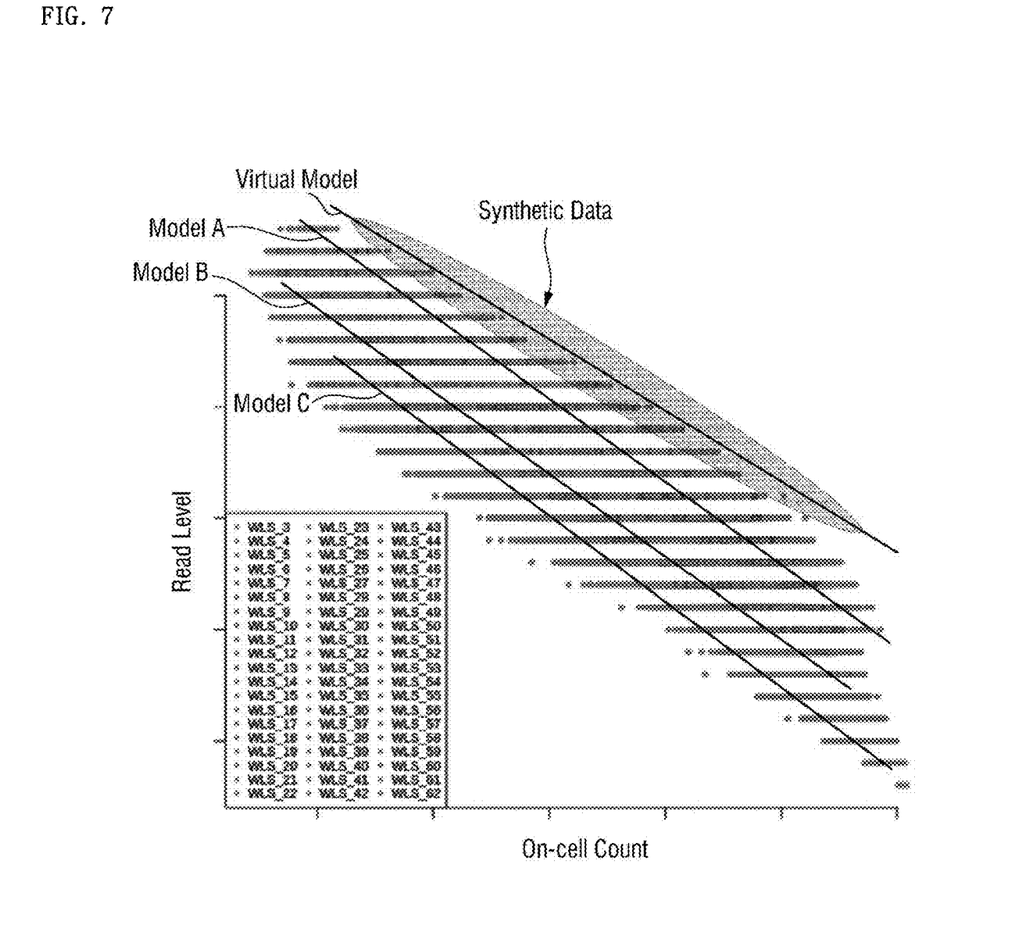
FIG. 7 is a diagram for explaining the relationship between features of a nonvolatile memory and machine learning models in a storage device according to embodiments.

FIG. 7 is a diagram for explaining the relationship between features of a nonvolatile memory and machine learning models in a storage device according to an embodiment.

Referring to FIG. 7, read level based on on-cell count may be illustrated for each wordline WL by using data collected from a large number of blocks of a memory device 150. In FIG. 7, the cell count may correspond to the illustrated X-axis, and the read level may correspond to the illustrated Y-axis. As illustrated in the drawing, each wordline may have a different trend for the relationship between one on-cell count value and a read level. That is, a machine learning model may be generated based on physical information and degradation information about the memory device 150.

For example, referring to model A through model C, if the trend of variations occurring between wordlines may be assessed by additionally collecting on-cell count information at various locations of memory cells and based on other physical information, the relationship between features and labels can be identified using at least one virtual machine learning model.

In some embodiments, the machine learning model may be for the entire memory region of the memory device 150.

In some embodiments, the machine learning model may be for some different memory regions of the memory device 150. This is because collecting a large number of features to generate one machine learning model may be performance overhead, for example, in an embodiment of an environment such as an SSD device.

In some embodiments, the machine learning model may be based on virtual data. Synthetic data shown may be generated based on a large amount data used to perform learning to generate machine learning models to be included in a model pool 111. The synthetic data are n measured values, but are virtual data of a region that may actually exist depending on the variation trend. A virtual machine learning model may represent a variation trend based on synthetic data. If the model pool 111 further includes the virtual machine learning model, the model pool 111 may have wider coverage of the operating features of the memory device 150.

Figure 8:
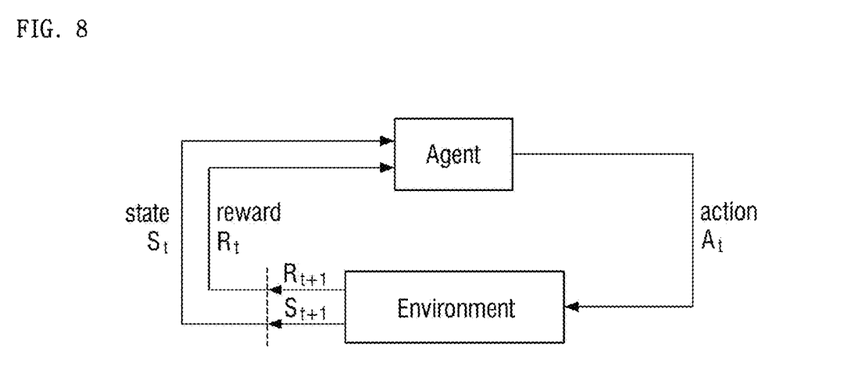
FIG. 8 is a conceptual diagram for explaining a reinforcement learning model according to embodiments.

FIG. 8 is a conceptual diagram for explaining a reinforcement learning model according to embodiments.

Reinforcement learning may denote a case where an agent defined in a certain environment recognizes a current state $S_t$ and selects an action that maximizes a reward $R_t$ from among selectable actions.

In order to continuously increase the prediction accuracy of a machine learning model, reinforcement learning may be utilized to tune the machine learning model in runtime.

In embodiments, the state information may be information stored in a feature information database of a memory device 150. That is, the state information may be at least one of memory cell position, physical information, profiling information, and degradation information such as PE cycle, retention, applied temperature change, read count, etc.

In embodiments, the action may be an action of changing a selected machine learning model or an action of increasing or decreasing a parameter value belonging to the selected machine learning model.

In embodiments, the reward may be the accuracy of a currently selected machine learning model. That is, the degree of error between a predicted value of the currently selected machine learning model and a measured value obtained by actually applying the current state may be considered as accuracy.

In embodiments, this may mean that the greater the error as the reward, the lower the accuracy. Therefore, if the error as the reward decreases after an agent tunes a machine learning model as an action, the accuracy increases. In this case, the agent may not tune the machine learning model. This is to perform tuning only when necessary.

A model tuner 113 may update the current machine learning model stored in a model pool 111 to the tuned machine learning model by reinforcement learning. The present disclosure reflects the current state of the memory device 150 in a machine learning model during runtime, thereby increasing the prediction accuracy of the machine learning model.

Figure 9:
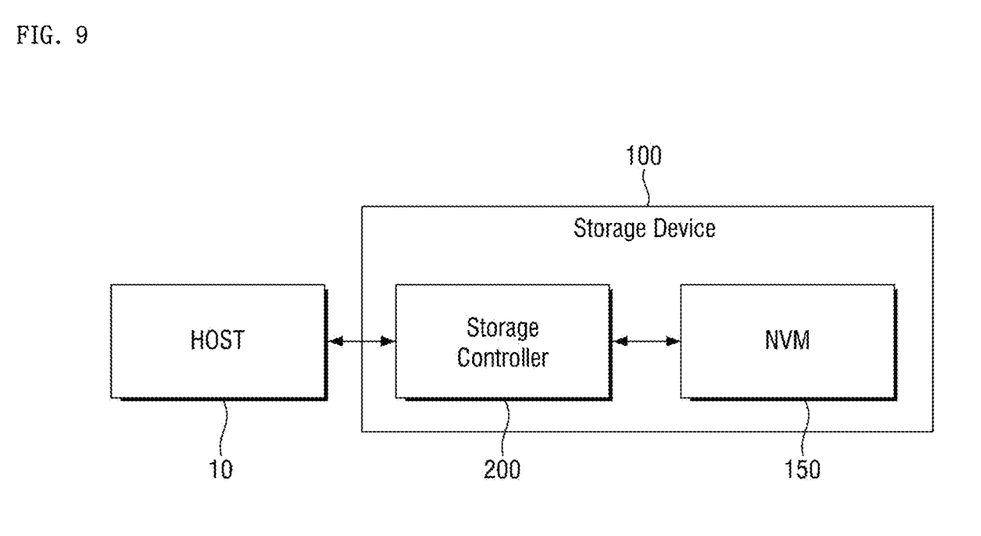
FIG. 9 is a block diagram of a computing system according to embodiments.

FIG. 9 is a block diagram of a computing system according to embodiments.

Referring to FIG. 9, the computing system may include a host 10 and a storage device 100.

The host 10 may send an access request to the storage device 100 to write data to the storage device 100 or read or delete stored data.

A storage controller 200 may control the overall operation of a memory device 150. The storage controller 200 may interpret a command provided from the host 10 and control an operation, for example a program, read, or erase operation, of the memory device 150 according to the interpretation result.

The storage controller 200 may be implemented as an integrated circuit (IC) or a system on chip (SoC) according to embodiments. Although not illustrated, the storage controller 200 may include a bus structure, a device interface, processors, an internal memory, a memory controller, and a buffer manager.

In some embodiments, the storage controller 200 may include a machine learning module 110 and a feature information database 160. Here, the feature information database 160 may store feature information about the memory device 150 in the internal memory of the storage controller 200. According to embodiments, the internal memory may be implemented as a one-time programmable (OTP) memory, a random access memory (RAM), a dynamic RAM (DRAM), a static RAM (SRAM), a buffer, a buffer memory, a cache, or a tightly coupled memory (TCM).

In some embodiments, the storage controller 200 may include the machine learning module 110, and the memory device 150 may include the feature information database 160.

In some embodiments, the storage controller 200 may include a model selector 112 and a model tuner 113, and the memory device 150 may include a model pool 111 and the feature information database 160.

In some embodiments, the storage controller 200 may include the machine learning module 110 and store profiling information 163, and the memory device 150 may store physical information 161 and degradation information 162.

In some embodiments, the memory device 150 may include the machine learning module 110 and the feature information database 160.

As is traditional in the field of the inventive concepts, the embodiments are described, and illustrated in the drawings, in terms of functional blocks units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

In concluding the detailed description, those skilled in the art will appreciate that many variations and modifications may be made to some example embodiments without substantially departing from the principles of the present disclosure. Therefore, the disclosed example embodiments are used in a generic and descriptive sense only and not for purposes of limitation.

What is claimed is:

1. A storage device comprising:
   a feature information database configured to store feature information about a memory device, wherein the feature information includes physical information relating to at least one of a manufacturing of the memory device and a physical arrangement of the memory device; and
   a machine learning module configured to select a machine learning model from a plurality of machine learning models corresponding to an operation of the memory device based on the feature information,
   wherein the memory device is configured to operate according to the selected machine learning model,
   wherein the physical information includes at least one from among a lot identifier, a chip number, a block address, and a wordline number.

2. The storage device of claim 1, wherein the machine learning module comprises:
   a model pool which includes the plurality of machine learning models; and
   a model selector configured to select the machine learning model from the model pool based on the feature information.

3. The storage device of claim 1, wherein the feature information database is further configured to store:
   direct information including the physical information about the memory device and degradation information according to the operation of the memory device; and
   indirect information calculated according to the operation of the memory device based on the direct information.

4. The storage device of claim 2, wherein the model selector is further configured to select the machine learning model based on the feature information about the memory device according to a mapping table.

5. The storage device of claim 2, wherein the model selector is further configured to:
   determine a plurality of predicted values of the plurality of machine learning models based on the feature information;
   determine a plurality of errors based on a comparison between the plurality of predicted values and an actual measured value in the memory device; and
   select the machine learning model based on the plurality of errors.

6. The storage device of claim 2, wherein the model selector is further configured to:
   select at least two machine learning models of the plurality of machine learning models as candidates based on the feature information about the memory device; and
   select the machine learning model by applying current feature information about the memory device to the candidates.

7. The storage device of claim 2, wherein the machine learning module further comprises a model tuner configured to tune the selected machine learning model during runtime of the memory device.

8. The storage device of claim 7, wherein the model tuner is further configured to increase or decrease parameters of the selected machine learning model.

9. The storage device of claim 7, wherein the model tuner is further configured to reselect the machine learning model selected by the model selector.

10. The storage device of claim 1, wherein the plurality of machine learning models comprises a virtual machine learning model generated based on synthetic data including training data used to perform learning to generate the plurality of machine learning models.

11. A method of operating a storage device, the method comprising:
    determining whether an operation of a memory device corresponds to a plurality of machine learning models;
    based on determining that the operation of the memory device corresponds to the plurality of machine learning models, determining indirect information about the memory device;
    selecting a machine learning model from the plurality of machine learning models based on at least one from among direct information about the memory device or the indirect information about the memory device; and
    executing inference according to the machine learning model,
    wherein the direct information includes physical information about at least one of a manufacturing of the memory device and a physical arrangement of the memory device, and
    wherein the indirect information is determined based on the physical information,
    wherein the physical information includes at least one from among a lot identifier, a chip number, a block address, and a wordline number.

12. The method of claim 11, wherein the plurality of machine learning models correspond to different regions of the memory device.

13. The method of claim 11, further comprising tuning the selected machine learning model by identifying an error between a measured value and a predicted value of the selected machine learning model based on the direct information.

14. The method of claim 13, wherein the tuning of the selected machine learning model comprises at least one from among changing parameters of the selected machine learning model or changing the machine learning model based on the error being greater than a threshold.

15. The method of claim 11, wherein the machine learning model is selected based on the direct information about the memory device according to a mapping table.

16. The method of claim 11, wherein the machine learning model is selected by minimizing an error between an actual measured value in the memory device and a predicted value of the machine learning model based on the direct information.

17. The method of claim 11, wherein the direct information includes degradation information about the memory device,
wherein the indirect information includes profiling information about the memory device, and
wherein the machine learning model is selected by checking a degree of degradation of the memory device at a time of the selecting.

18. A storage device comprising:
a memory device; and
a storage controller configured to:
select a machine learning model from a plurality of machine learning models based on feature information about the memory device, wherein the feature information includes physical information relating to at least one of a manufacturing of the memory device and a physical arrangement of the memory device,
execute inference according to the selected machine learning model, and
tune the selected machine learning model according to an error between an actual measured value in the memory device and a predicted value of the selected machine learning model based on the feature information,
wherein the physical information includes at least one from among a lot identifier, a chip number, a block address, and a wordline number.

19. The storage device of claim 18, wherein the storage controller comprises:
a machine learning module including the plurality of machine learning models, and further configured to select the machine learning model based on the feature information, and tune the selected machine learning model; and
a feature information database configured to store the feature information about the memory device.

20. The storage device of claim 18, wherein the storage controller comprises a machine learning module including the plurality of machine learning models, and further configured to select the machine learning model based on the feature information and tune the selected machine learning model, and
wherein the memory device comprises a feature information database configured to store the feature information about the memory device.

* * * * *